April 23, 1963

V. A. HOOVER 3,087,105

ELECTROMECHANICAL ACTUATOR WITH LIMITING MECHANISM

Filed Sept. 5, 1957

INVENTOR.
VAINO A. HOOVER
BY Fulwider Mattingly & Huntley
ATTORNEYS

April 23, 1963 V. A. HOOVER 3,087,105
ELECTROMECHANICAL ACTUATOR WITH LIMITING MECHANISM
Filed Sept. 5, 1957 3 Sheets-Sheet 2
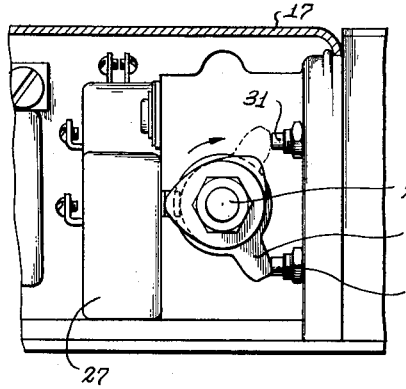
Fig. 4
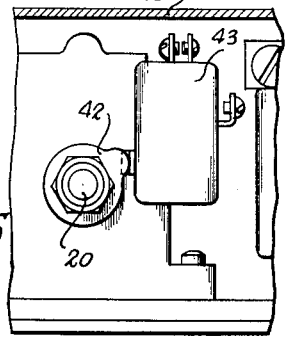
Fig. 5
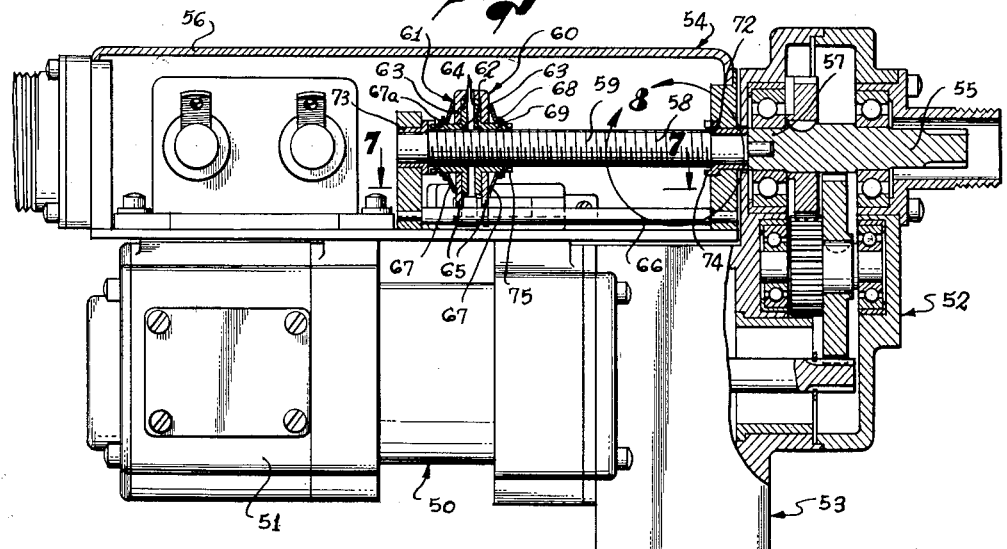
Fig. 6
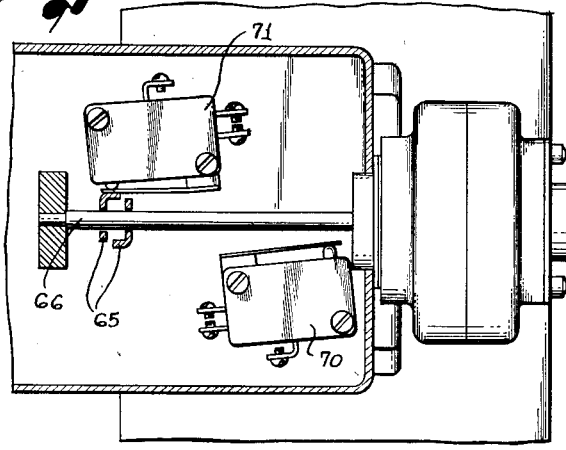
Fig. 7
Fig. 8
INVENTOR.
VAINO A. HOOVER
BY Fulwider, Mattingly & Huntley
ATTORNEYS

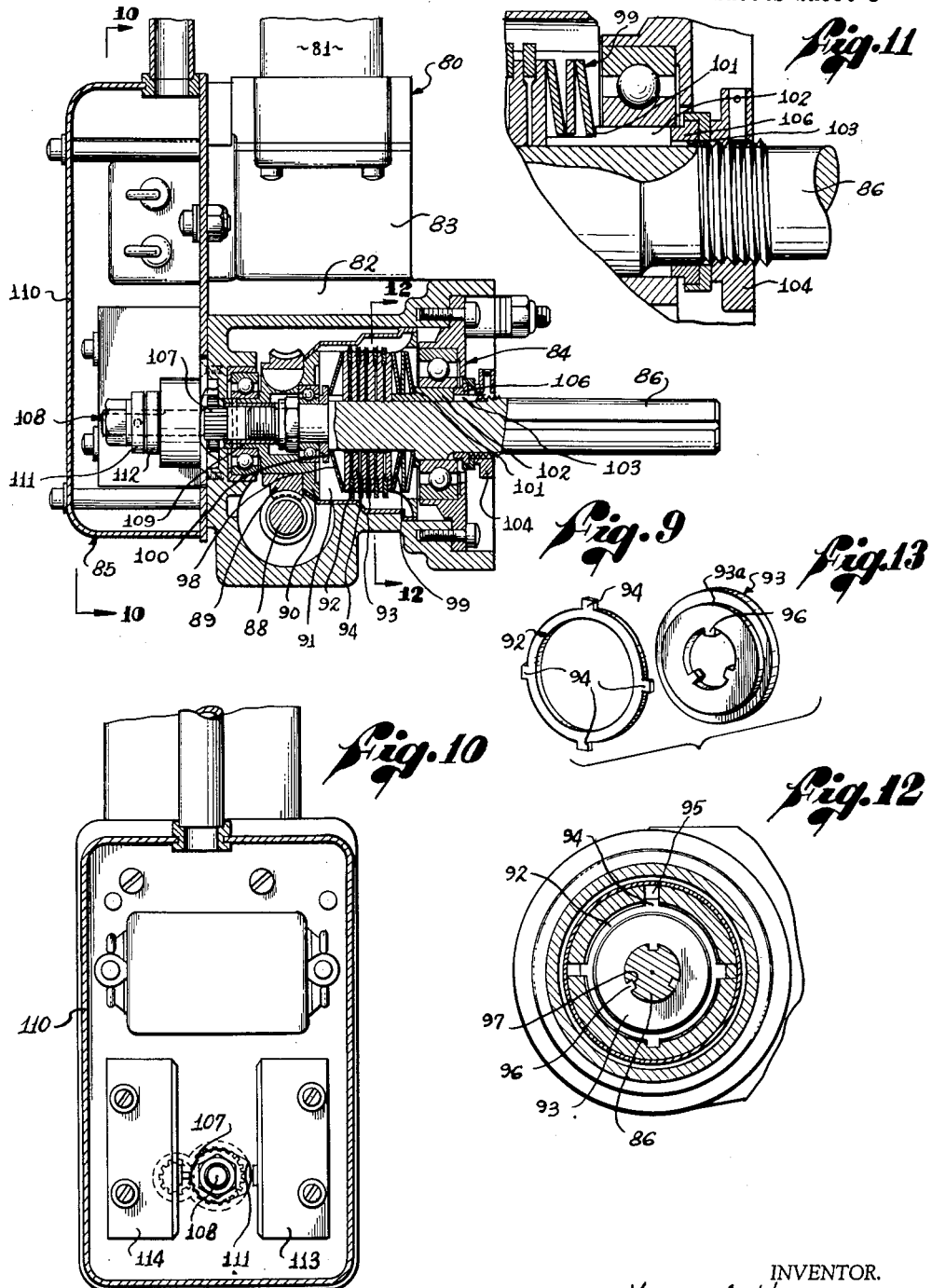

United States Patent Office 3,087,105
Patented Apr. 23, 1963

3,087,105
ELECTROMECHANICAL ACTUATOR WITH
LIMITING MECHANISM
Vaino A. Hoover, 2100 Stoner Ave., Los Angeles, Calif.
Filed Sept. 5, 1957, Ser. No. 682,121
4 Claims. (Cl. 318—468)

This invention relates generally to electromechanical actuators, and more particularly to an actuator with a limiting mechanism for limiting the revolutions of its output shaft to a predetermined number.

Electromechanical actuators have been found to be a very effective means for actuating movable parts. One of the principal applications for these actuators is in modern aircraft, where they are used for such purposes as the actuation of trim tabs and other parts. Such actuators also serve effectively in many other applications, including industrial automation.

In my copending application, Serial No. 384,741, filed April 14, 1953, now Patent Number 2,700,147, and entitled, Mechanical Actuator, I disclose an electromechanical actuator with a linear output. The electromechanical actuators in this application have a rotatory output. These actuators consist generally of a relatively small electric motor coupled to reduction gearing which reduces the speed and increases the torque of the motor's rotational output.

In most applications of the electromechanical actuator it is generally desirable to control its output movement within specified limits. The actuator incorporating my invention has, as an integral part thereof, a limiting mechanism that controls the movement of the actuator by limiting the movement of its output shaft to a predetermined amount. My invention also incorporates means into the actuator which protect it in case the limiting mechanism fails to operate and mechanical limits are engaged.

It will be readily appreciated that, particularly in aircraft applications, the operation of an electromechanical actuator must be as foolproof as possible, because its failure to operate may produce serious consequences. This is especially true with regard to the limiting mechanism of the actuator. Failure of a limiting mechanism to operate correctly may for instance, cause jamming of the controls powered by the actuator, overheating of the actuator drive motor, or destruction of the limiting mechanism itself. It is therefore highly desirable in such actuators, not only that the limiting mechanism be as free as possible from failure to operate, but also that additional protective features be provided which will prevent serious harm should such a failure occur. It is in regard to this double protection that prior actuators have been particularly lacking.

Another requirement for such actuators, again particularly in aircraft applications, is that in addition to the above capabilities, the units be sufficiently sturdy to withstand sustained vibration and rapidly varying atmospheric conditions, and be relatively lightweight. A further feature, which is highly desirable, is that the limiting mechanism of the actuators be quickly and easily adjustable to the limits desired. In addition, the actuators should be as simple and inexpensive as possible.

It is therefore a major object of my invention to provide an electromechanical actuator and limiting mechanism which satisfies all of the above-mentioned requirements.

It is also an object of my invention to provide an electromechanical actuator with a limiting mechanism for limiting the rotation of its output shaft to a predetermined amount which incorporates means for protecting its parts from damage in case the limiting mechanism fails to operate.

It is another object of my invention to provide an actuator of the character described above in which the limiting mechanism is formed integral with the drive motor and may be separated as a unit with the motor from the other components of the actuator and the drive device, thereby avoiding the necessity for any electrical disconnections.

A further object of my invention is to provide an actuator of the type described above in which the limiting mechanism can be either conveniently manually adjusted to the limits desired or automatically adjusted to the mechanical limits of the driven device.

Still another object of this invention is to provide an actuator as described above, which is relatively lightweight and sufficiently rugged to withstand the rigors of aircraft installation, such as vibration and radical changes in atmospheric conditions.

Still a further object of this invention is to provide an actuator as described above, which, in addition to the above advantages is relatively simple and inexpensive to construct.

These and other objects and advantages will be apparent from the following detailed description of several preferred embodiments of my invention when read in connection with the attached drawings in which:

FIGURE 4 is a sectional view taken on line 4—4 in FIGURE 3;

FIGURE 5 is a sectional view taken on line 5—5 in FIGURE 3;

FIGURE 6 is a partially sectioned, side-elevational view of a second preferred embodiment of my actuator;

FIGURE 7 is a sectional view taken on line 7—7 in FIGURE 6;

FIGURE 8 is an enlarged sectional view of area 8 in FIGURE 6;

FIGURE 9 is a partially sectioned, side-elevational view of a third preferred embodiment of my actuator;

FIGURE 10 is a sectional view taken on line 10—10 in FIGURE 9;

FIGURE 11 is an enlarged sectional view taken at area 11 in FIGURE 9;

FIGURE 12 is a sectional view taken at line 12—12 in FIGURE 9; and

FIGURE 13 is a perspective view of the disk elements shown in FIGURE 9.

Figure 1:
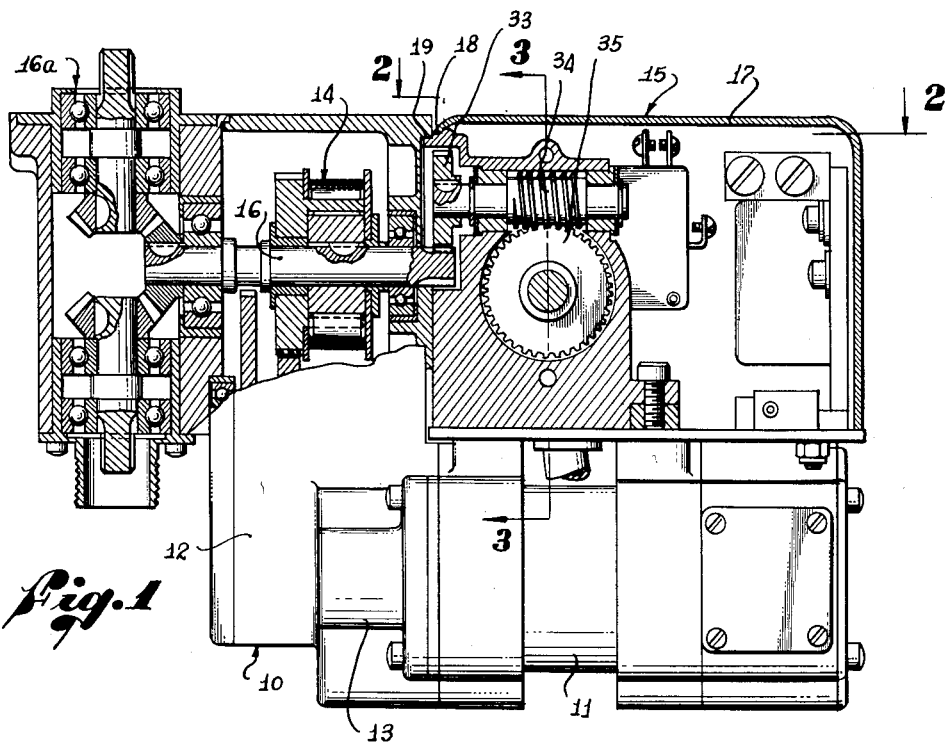
FIGURE 1 is a partially sectioned side-elevational view of a first preferred embodiment of my actuator.

Referring now to the drawings, and particularly to FIGURE 1 thereof, the numeral 10 designates generally an actuator incorporating one embodiment of my invention. The actuator 10 comprises an electric drive motor 11, reduction gearing 12, a magnetic clutch and brake unit 13, a torque limiting clutch 14, and a limiting mechanism 15. The reduction gearing 12 serves to reduce the speed and increase the torque of the drive motor 11. The purpose of the magnetic clutch and brake unit 13 is to detachably couple the drive motor 11 to the reduction gearing 12. A magnetic clutch and brake unit of the type disclosed in my Patent No. 2,618,368, issued November 18, 1952, and entitled Magnetic Clutch, may be satisfactorily used for this purpose. As this patent reveals, the main advantage of the magnetic clutch and brake unit is that it may be automatically actuated to detach the motor from the reduction gearing. Its principal use is to allow two actuators, when driven as a pair, to be operated by one drive motor, should the other drive motor fail. The necessary mechanical interconnection for such operation is achieved by use of the differential gearing 16a which is attached to the output shaft 16. In applications where the actuators are not used in pairs and such automatic detachability is not required, the drive motor and reducing gearing may, of course, be joined by any suitable coupling means.

The torque limiting clutch 14 is connected between the reduction gearing 12 and the output shaft 16 of the actuator. The purpose of this clutch is to prevent the drive motor 11 and reduction gearing 12 from supplying more than a predetermined maximum torque to the output shaft of the actuator so that if the actuator or driven device jam or reach their mechanical limits, they will not be damaged nor the drive motor of the actuator overloaded. A torque limiting clutch, such as that disclosed in my Patent No. 2,668,426, issued February 9, 1954, and entitled, Torque Limiting Clutch, may be used quite effectively for this purpose.

The limiting mechanism 15 is enclosed in a separate housing 17, one face 18 of which abuts the housing of the reduction gearing and torque limiting clutch. An opening 19 is provided in the face 18 through which the limiting mechanism is connected to and driven by the output shaft 16. The connection between the output shaft 16 and the limiting mechanism 15 is readily detachable so that the limiting mechanism may be removed together with the drive motor 11 from the other components of the actuator and the driven device, thus allowing separation of the major components of the actuator without the disconnection of any electrical circuits.

Figure 2:
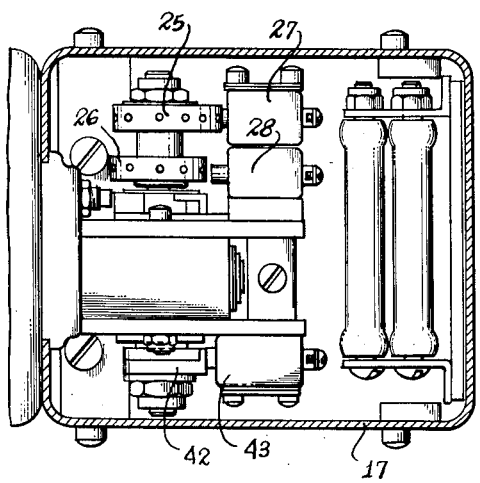
FIGURE 2 is a sectional view taken on line 2—2 in FIGURE 1.
Figure 3:
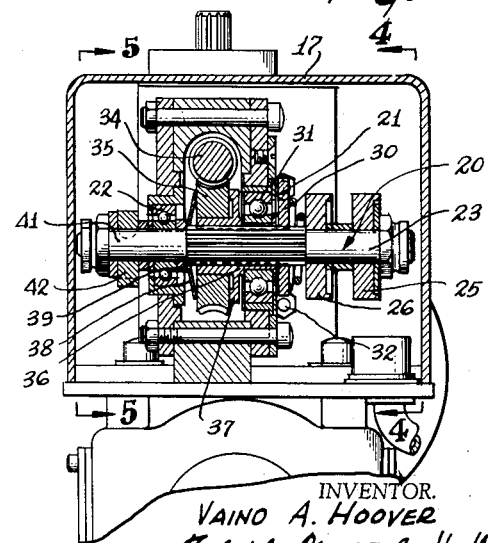
FIGURE 3 is a sectional view taken on line 3—3 in FIGURE 1.

As shown in FIGURES 2 and 3, the limiting mechanism 15 includes a cam shaft 20 rotatably mounted in two spaced bearings 21 and 22 in the limiting mechanism housing 17. The cam shaft 20 extends beyond the bearings 21 and 22 at each end and on the end 23, extending beyond the bearing 21, the shaft carries two rotary cams, a clockwise cam 25 and a counterclockwise cam 26. These cams 25 and 26 are positioned in spaced relationship and fixedly mounted on the cam shaft 20 for rotation therewith.

Mounted in the limiting mechanism housing 17 adjacent the cams 25 and 26 are two switches, a clockwise switch 27 disposed with its operating button adjacent the clockwise cam 25, and a counterclockwise switch 28 disposed with its operating button adjacent the counterclockwise cam 26. The switches 27 and 28 are actuated respectively by cams 25 and 26 at predetermined positions during rotation of the cam shaft 20. The switches 27 and 28 are connected in the energizing circuit of the drive motor 11, the clockwise switch 27 in the energizing circuit causing clockwise rotation of the output shaft 16, and the counterclockwise switch 28 in the energizing circuit causing counterclockwise rotation of the output shaft, so that when either of the switches is actuated, the energizing circuit which it controls is opened, preventing operation of the motor in that direction.

Therefore, when the drive motor 11 is energized so as to rotate the output shaft 16 in a clockwise direction, the cam shaft 20, which is connected to the output shaft in a manner described later, is also turned and after a predetermined amount of rotation will cause the clockwise cam 25 to engage the actuating button on the clockwise switch 27, thus opening the clockwise energizing circuit and stopping the actuator. The actuator 10 may not then be energized again in a clockwise direction, but may be energized in a counterclockwise direction. Energizing the drive motor 11 so as to rotate the output shaft 16 in a counterclockwise direction will, in turn, rotate the cam shaft 20 in a direction which carries the clockwise cam 25 away from actuating engagement with the clockwise switch 27 and the counterclockwise cam 26, which in this direction of rotation leads the clockwise cam 25, toward the counterclockwise switch 28. After the cam shaft 20 has turned a predetermined amount, the counterclockwise cam 26 will engage and actuate the counterclockwise switch 28 opening the counterclockwise energizing circuit and again stopping the actuator.

The operation of the clockwise and counterclockwise cams and switches therefore provides an accurate means for controlling the rotation of the output shaft within predetermined limits.

To prevent the cam shaft 20 from rotating too far in either direction, as could happen if one of the switches failed to operate or the cams were not properly set, mechanical stop means are provided. The mechanical stop means consist of a stop arm 30 mounted on end 23 of cam shaft 20 just inboard of the cams 25 and 26, and adjustable screw stops 31 and 32 which are mounted in the limiting mechanism housing 17 (see FIGURES 4 and 5).

The stop arm 30 is fixed on the cam shaft 20 so that it rotates with the shaft, and the screw stops 31 and 32 are disposed in alignment with stop arm 30 so that sometime during the travel of the cam shaft 20 in one direction, the arm 30 engages the stop screw 31 and sometime during the travel of the shaft in the other direction, the arm 30 engages the stop 32. The screw stops 31 and 32 are threaded in the limiting mechanism housing 17 so that they can be adjusted from outside of the housing to control their point of engagement with the stop arm 30. The point of engagement between the stop arm 30 and the stops 31 and 32 is generally set at just beyond the point where the cams 25 and 26 would normally actuate their respective switches. The stop arm 30, therefore, only engages the stops 31 and 32 when the switches fail to operate.

The cam shaft 20 of the limiting mechanism 15 is connected to a splined end of the output shaft 16 through pinion gear 33, a worm 34, and a worm wheel 35. The pinion gear 33 is driven by the output shaft and, in turn, drives the worm 34 and worm wheel 35. The worm wheel 35 is freely mounted on the cam shaft 20 intermediate the bearings 21 and 22 so that it may both rotate with respect to the shaft and slide axially thereon.

To couple the worm wheel 35 to the cam shaft 20 so that the cam shaft is driven by the output shaft 16, a flanged collar 36 is fixedly mounted on the cam shaft with its flange 37 in face-to-face engagement with one side of the worm wheel 35. A resilient dish-shaped washer 38 is also mounted on cam shaft 20 on the other side of worm wheel 35, and is compressed between an annular shoulder 39 and the worm wheel so as to urge the worm wheel into engagement with flange 37. Sufficient frictional engagement is thereby established between worm wheel 35 and flange 37 to cause cam shaft 20 to turn with the worm wheel.

The frictional engagement between worm wheel 35 and flange 37 also serves as a torque-limiting mechanism, and protects the actuator from damage when the limiting mechanism is carried into its mechanical limits.

If, for instance, cam shaft 20 is driven into its mechanical limits, where the stop arm 30 engages one of the stop screws 31 and 32, the frictional engagement between worm wheel 35 and flange 37 begins to slip, allowing the worm wheel to continue to rotate while collar 36 and cam shaft 20 remain fixed. To permit this slippage between flange 37 and worm wheel 35 without damage, the flange is made of bronze and the worm wheel of steel so that a bronze on steel bearing relationship exists between the flange and worm wheel during this slippage.

If, after the limiting mechanism has been driven into its mechanical limits in one direction, and the coupling between the worm wheel 35 and flange 37 caused to slip, the drive motor 11 is reversed, the urging of the resilient washer 38 will be sufficient to reestablish the frictional engagement and cam shaft 20 will be rotated out of its mechanical stops. The frictional engagement between the worm wheel 35 and flange 37 therefore automatically reestablishes itself whenever the cam shaft can be freely rotated.

On the end 41 of cam shaft 20, which extends beyond the bearing 22, another rotary cam 42 is fixedly mounted.

The cam 42 controls a switch 43 mounted adjacent the cam in the limiting mechanism housing 17. The switch 43 is connected in an indicator circuit and serves to indicate the position of cam shaft 20 and the rotary cams 25 and 26.

The actuator 10 of this first embodiment is therefore fully protected against damage should the limiting mechanism 15 fail to deenergize the drive motor 11 before mechanical limits are engaged. If, for instance, the actuator is rotating in one direction and limiting mechanism 15 fails to deenergize drive motor 11 before the limiting mechanism mechanical stops are reached, engagement of these stops does not block rotation of output shaft 16, nor place an excessive load on drive motor 11 or the limiting mechanism itself because of the bearing-like slippage between the flange 37 of collar 36 and the worm wheel 35. If upon continued rotation of the actuator, mechanical limits of the driven device are engaged, blocking output shaft 16, damage to the driven device and the actuator are prevented by operation of the torque-limiting clutch 14 which permits slippage between the output shaft and reduction gearing 12.

The self-protecting features of actuator 10 also make it possible to automatically coordinate the limiting mechanism cam shaft 20 with the mechanical limits of the driven device. This may be done by first setting the cams 25 and 26 and the stop screws 31 and 32 so that the allowed arc of travel of cam shaft 20 corresponds to the allowed travel of the driven device. Then with the limiting mechanism switches 27 and 28 shorted out of the drive motor circuits, the actuator 10 is driven first in one direction until the mechanical limits of the driven device are engaged and the torque-limiting clutch 14 operates, and then in the other. In one of these directions the mechanical stops of the limiting mechanism will be engaged before the mechanical limits of the driven device are reached. When this happens flange 37 will slip on worm wheel 35 until the mechanical limits of the driven device are reached, thereby matching driven device mechanical limits to those of the limiting mechanism. With the switches 27 and 28 returned to operation, the limiting mechanism will then stop the actuator, just before the mechanical limits of the driven device are reached.

A second embodiment of my invention is disclosed in FIGURES 6 through 8. In this embodiment, the actuator 50 comprises an electric motor 51, reduction gearing 52, a magnetic clutch and brake unit 53, and a limiting mechanism 54. The magnetic clutch and brake unit 53 is used to detachably couple the electric motor 51 to the reduction gearing 52 in the same manner as disclosed in the first embodiment. The reduction gearing 52 also serves the same purpose as in the first embodiment except that it is directly connected to the output shaft 55, rather than being connected through a torque-limiting clutch, as in the first embodiment. In this second embodiment I do not use a torque-limiting clutch in conjunction with the output shaft 55.

The limiting mechanism 54 is enclosed in a housing 56 which mounts on the drive motor 51 with one end abutting the housing of reduction gearing 52 adjacent the tail end 57 of the output shaft 55 in substantially the same manner as in my first embodiment. Here also, the limiting mechanism is releasably connected to the output shaft, so that it may be easily detached and the limiting mechanism and drive motor separated as a unit from the other components of the actuator and the driven device.

The limiting mechanism 54 has a cam shaft 58 which is rotatably mounted in the limiting mechanism housing 56. The cam shaft 58 is coupled to output shaft 55 so that it rotates whenever the output shaft is rotated, and has threads 59 on its periphery.

Two cam assemblies 60 and 61 are mounted on cam shaft 58 in engagement with threads 59. The cam assemblies 60 and 61 each consist of a flanged nut 62 which engages threads 59 and a disc-shaped brake 63 which is mounted on the periphery of the nuts 62 in face-to-face engagement with their flanges 64. The brakes 63 have arms 65 which extend radially outward from their periphery and are forked at their outer end. A guide rod 66 is mounted in limiting mechanism housing 56 parallel to but slightly spaced from cam shaft 58. The guide rod 66 does not rotate but is engaged by forked arms 65 of the brakes 63 to prevent their rotation.

Dish-shaped resilient washers 67 are disposed on each of the nuts 62 and compressed between the brakes and annular back-up washers 67a held by snap rings 68. The snap rings 68 fit into peripheral grooves 69 in each of the nuts 62 and extend slightly therefrom to form radial shoulders on their peripheries. The washers 67 hold brakes 63 in frictional engagement with the flanges 64 and thus normally prevent rotation of nuts 62 when cam shaft 58 is rotated and cause cam assemblies 60 and 61 to travel along the cam shaft on threads 59.

Also mounted in the limiting mechanism housing 56, adjacent the cam shaft 58, are two switches, a clockwise switch 70 which is disposed at one end of the cam shaft and a counterclockwise switch 71 disposed at the other end. These switches 70 and 71 are positioned for periodic actuation by the cam assemblies 60 and 61 and are connected, respectively, in the energizing circuits of drive motor 51 which cause clockwise and counterclockwise rotation of output shaft 55.

Therefore, when cam shaft 58 is rotated, the cam assemblies 60 and 61 travel along cam shaft 58 to the position where they engage the actuating button of one of the switches 70 and 71 and deenergize drive motor 51. The relative positions of the cam assemblies on cam shaft 58 may be adjusted so that the engagement of switches 70 and 71 corresponds to the desired rotational limits of output shaft 55. This adjustment may be made manually or automatically in a manner explained later.

The operation of actuator 50 is as follows: When drive motor 51 is energized to rotate output shaft 55, through magnetic clutch and brake assembly 53 and reduction gearing 52, in a clockwise direction, cam shaft 58 rotates carrying cam assemblies 60 and 61 toward clockwise switch 70. Upon reaching switch 70 cam assembly 60 engages the actuating button and opens the switch deenergizing drive motor 51 and stopping the actuator. Further operation of the actuator in a clockwise direction is then impossible. Drive motor 51 may be energized so as to rotate output shaft 58 in a counterclockwise direction, however, and if so energized will rotate cam shaft 58 so as to carry the cam assemblies 60 and 61 toward counterclockwise switch 71 at its opposite end. As soon as cam assembly 60 has been carried out of engagement with clockwise switch 70 that switch closes and drive motor 51 may again be operated so as to rotate the output shaft 55 clockwise. Upon continued counterclockwise rotation of output shaft 55, cam assembly 61 will be brought into engagement with the actuating button of counterclockwise switch 71 and will open that switch, again deenergizing drive motor 51 and stopping the actuator.

The frictional engagement between flanges 64 of the nuts 62 and the brakes 63 also serves as a torque-limiting mechanism to protect the actuator from damage if the limiting mechanism fails to operate. If either of the switches 70 and 71 fails to operate when actuated by their respective cam assemblies, the cam assemblies 60 and 61 will be carried into mechanical stops 72 and 73 positioned at the ends of cam shaft 58. To assure positive engagement between the cam assemblies and the mechanical stops 72 and 73, matching sets of jaws are provided on the mechanical stops and the cam assemblies. The jaws 74 on the mechanical limits 72 and 73 rotate with cam shaft 58 and the jaws 75 on the cam assemblies are affixed to the nuts 62 so that when the cam assemblies 60 and 61 are carried into the mechanical limits and the sets of jaws engage, the nuts 62 are forced to rotate with the cam shaft and therefore no longer travel axially. The brakes 63 of the cam assemblies cannot rotate with nuts 62, however, since they are held fixed by their engagement with the guide rod 66. The nuts 62 therefore turn with respect to brakes 63.

To permit nuts 62 to rotate with respect to the brakes 63 without damage to the limiting mechanism 54 the nuts are made of bronze and the brakes of steel. Since the brakes 63 are disposed in face-to-face engagement with flanges 64 on the nuts 62, a bronze-on-steel bearing relationship exists at this point and continued rotation of the nuts does not damage the cam assemblies nor cause excessive load on drive motor 51. The nuts 62 and brakes 63 therefore slip in this bearing relationship until the actuator is stopped or reversed.

When the actuator 51 is reversed, the cam assemblies release themselves from the mechanical limits and commence traveling toward the opposite end of cam shaft 58. Because the pins 74 and 75 engage positively when brought together, they prevent the nuts 62 from being tightened or jammed against the mechanical stops. Instead, the nuts are immediately released when the actuator reverses and brakes 63 keep the nuts from further rotation and cause them to travel on threads 59.

It will be appreciated that the above-described self-protecting feature of the limiting mechanism may be used to set the limiting mechanism cam assemblies 60 and 61 to the mechanical limits of a driven device. This may be done by shorting the switches 70 and 71 and driving the device first into one mechanical limit and then into the other. During this operation, the cam assemblies 60 and 61 of the limiting mechanism will be carried first into one mechanical stop, for example 72, and will remain in that stop until the driven device reaches its mechanical limit and the actuator is deenergized or reversed. When the actuator is reversed, the cam assemblies will immediately begin to travel in the opposite direction on the cam shaft 58 until they are carried into the other mechanical stop 73 and remain there until the driven device reaches its mechanical limits in this direction and the actuator deenergized. In this manner the limits of the cam assemblies 60 and 61 are matched with the mechanical limits of the driven device. The switches 69 and 70 are then put back in functioning condition and whenever the driven device approaches one of its mechanical limits the cam assembly will also be approaching one of their limits and just before the limits are reached the switch controlling operation in that direction will be engaged by its cam assembly and deenergize the actuator.

In this second embodiment of my invention the actuator 50 has no torque-limiting mechanism between the drive motor 51 and the output shaft 55, as in the first embodiment, but only in the limiting mechanism 54. Therefore, unless external protection means are provided, the power unit must be able to withstand the blocking of output shaft 55 by the mechanical limits of the driven device. Also, the mechanical limits of the driven device must be able to withstand the driving force of the actuator. The limiting mechanism 54, however, is protected by the torque-limiting mechanism in cam assemblies 60 and 61. It should be understood, of course, that if desired, a torque-limiting clutch could be provided between output shaft 55 and reduction gearing 52 as in the first embodiment.

The limiting mechanism of this second embodiment is so constructed that it requires many revolutions of cam shaft 58 to bring the cam assemblies into engagement with their respective switches rather than just a partial revolution as was the case in the first embodiment. For this reason limiting mechanism 54 may be connected directly to the output shaft, rather than through reduction gearing.

In FIGURES 9 through 11 I have shown a third embodiment of my invention. The actuator 80 in this embodiment has a drive motor 81, reduction gearing 82, a magnetic clutch and brake unit 83, a torque-limiting clutch 84, and a limiting mechanism 85. The drive motor 81, reduction gearing 82 and magnetic clutch and brake unit 83 are substantially the same as those disclosed in the previous embodiments. The torque-limiting clutch 84 and the limiting mechanism 85, however, are different.

The torque-limiting clutch 84 in this embodiment is disposed between the reduction gearing 82 and output shaft 86 similar to the arrangement in the first embodiment. The torque-limiting clutch itself, however, is considerably different. In this embodiment the torque-limiting clutch 84 is driven from reduction gearing 82 by a worm 88 and a worm wheel 89. The worm wheel 89 is freely mounted on output shaft 86 so that it may rotate with respect to the shaft. A sleeve 90 having a bore 91 of considerably greater diameter than output shaft 86 is attached to one face of the worm wheel 89 and extends axially therefrom concentric with the shaft. Inside the bore 91, mounted in face-to-face relationship on output shaft 86, are a plurality of disks. These disks consist of two different types, sleeve disks 92 and shaft disks 93, which are disposed alternately. The sleeve disks 92 have a bore considerably larger than output shaft 86 and, instead of riding on the shaft are carried on axially projecting annular shoulders 93a on the shaft disks 93. The sleeve disks 92 are connected to the sleeve 90 by a plurality of radial projections 94 on their peripheries which engage matching axially directed grooves 95 in sleeve bore 91. The shaft disks 93, however, rotate freely with respect to sleeve 91 and are connected to output shaft 86 by a plurality of radial projections 96 in the bores of the disks which engage grooves 97 in the shaft. The sleeve disks 92, therefore, rotate with the sleeve 90 and worm wheel 89 while the shaft disks 93 rotate with output shaft 86.

To establish frictional engagement between the disks 92 and 93 and thereby couple worm wheel 89 to output shaft 86, resilient dish-shaped washers 98 and 99 are provided on the shaft at either end of the plurality of interspaced disks. The washer 98 is positioned at the end adjacent the worm wheel 89 and is compressed between the shoulder 100 and the terminal sleeve disk 94. The washer 99, which is actually a double washer to provide added resiliency, is positioned at the other end of the group of disks adjacent the drive end of output shaft 86 and is compressed between the terminal shaft disk 95 and shoulders 101 on a plurality of radially projecting keys 102 mounted in output shaft 86. The keys 102 are disposed in radial grooves 103 cut axially in the shaft 86 and are movable axially in these grooves. The keys 102 are positioned in grooves 103 by an adjustment nut 104 which is threadedly mounted on output shaft 86. The nut 104 has an annular shoulder 106 that engages the outer ends of keys 102, so that threadedly adjusting the nut on output shaft 86 changes the axial positioning of the keys in grooves 103 and regulates the compression of washer 99.

The operation of torque-limiting clutch 84 is as follows: With the compressed washers 98 and 99 urging sleeve disks 92 and shaft disks 93 into frictional engagement, the rotation of worm wheel 89 by reduction gearing 82 drives output shaft 86. However, when the torque load on output shaft 86 increases beyond a predetermined amount, the frictional coupling between the disks 92 and 93 gives way and begins to slip. To permit this slippage between the disks to take place without damage, the sleeve disks 92 are made of steel, and the shaft disks 93 of bronze. The disks therefore rotate with respect to each other in a bronze-on-steel bearing relationship. The torque load necessary to cause slippage between the disks can be regulated by adjustment of the nut 104, because this nut regulates, through the keys 102, the resilient urging of the washers 98 and 99 which forces the disks into engagement. Therefore, increasing the compression of the disks increases the torque load necessary to cause slippage in the clutch.

The limiting mechanism 85 of this embodiment has a cam shaft 108 which is parallel to, but slightly offset from output shaft 86 and is connected to the worm wheel 89 by a splined stub shaft and gear 107. The stub shaft 107 is splined to a drum 109 which is attached to worm wheel 89 on the opposite side from sleeve 90. The limiting mechanism is contained in a housing 110 which is mounted on the drive motor 81 with one wall abutting the housing of the reduction gearing 82 adjacent the torque-limiting clutch 84, and as in the other embodiments, the splined shaft and gear connection 107 is readily releasable to permit easy disconnection of the limiting mechanism and drive motor, as a unit, from the other components of the actuator.

Cam shaft 108 has two rotary cams fixedly mounted thereon, a clockwise cam 110 and a counterclockwise cam 111. These cams operate two switches mounted in the limit mechanism housing 112, a clockwise switch 113 disposed with its actuating button adjacent the clockwise cam 110, and a counterclockwise switch 114 disposed with its actuating button adjacent the counterclockwise cam 111. When the worm wheel 89 is driven in either direction by the reduction gearing 82, it in turn rotates output shaft 86 and cam shaft 108, carrying the cam set to limit the revolutions of the output shaft in that particular direction, towards its associated switch. When output shaft 86 has moved the desired amount, the cam actuates the switch deenergizing drive motor 81 and stopping the actuator.

In this embodiment, the actuator is protected against damage in case of a failure in the operation of the limiting mechanism 85 by operation of the torque-limiting clutch 84. For example, if one of the switches 113 and 114 should fail to operate, thereby allowing the driven device to engage its mechanical limits, the output shaft 86 will be blocked against further rotation. No damage will be done, however, because the torque-limiting clutch will begin to slip as explained above, thus allowing drive motor 81 to continue operating without overheating or causing damage to the actuator or the driven device. The limiting mechanism 85 has no mechanical limits.

In this third embodiment, it is possible to set the limiting mechanism to the mechanical limits of the driven device automatically, as in the first embodiment. This adjustment is performed by merely activating the actuator and moving the driven device into one of its mechanical limits in such a sequence that the driven device reaches the mechanical limit before the cam which controls that direction of rotation reaches its associated switch. The torque-limiting clutch 84 will then slip while cam shaft 108 continues to rotate carrying the cam towards its switch. When the cam actuates its switch, deenergizing drive motor 81, the actuator will stop. The direction of the actuator may then be reversed and the other cam and switch of the limiting mechanism 85 coordinated with the mechanical limit of the driven device in the other direction in the same manner.

The limiting mechanism 85 in this third embodiment has a much lower step down gear ratio with respect to the output shaft 86 than in either of the other embodiments so that the cam shaft 108 makes a complete rotation for every few rotations of output shaft 86. If a greater ratio is desired it may be provided, of course.

From this detailed description of preferred embodiments of my invention it will be understood that, in all embodiments of my invention, a torque-limiting mechanism is provided which protects either the complete actuator and the driven device, or at least the limiting mechanism, from damage, in case mechanical limits are engaged. Furthermore, the construction of each embodiment is such that the electrically interconnected components, that is the limiting mechanism and the drive motor, may be quickly and easily separated as a unit from the other components and the driven device.

Also, it should be appreciated that the various components of the power units shown in the embodiments may be interchanged to provide whatever combination of limiting mechanism and torque-limiting clutch is desired. For instance, the limiting mechanism 54 from the second embodiment could be substituted into the third embodiment for the limiting mechanism 85. Or, any other desired combination could be worked out.

While the embodiments of my invention herein disclosed and described are fully capable of achieving the objects and providing the advantages stated, it should be understood that I do not intend to limit myself to the particular details herein disclosed except as defined in the appended claims.

I claim:

1. In an electromechanical actuator having an operating shaft rotatable in one direction to move a structure to an extended position, and in the opposite direction to move the structure to a retracted position, wherein a reversible motor for rotating the shaft is coupled to the shaft through gearing and clutch means, limit control apparatus comprising: a control shaft; means including slip clutch means for coupling said control shaft to the operating shaft; a pair of switch means actuatable for stopping the motor; switch actuating means operable by said control shaft, said actuating means being adapted to actuate the respective ones of said switch means when the operating shaft has turned through the number of revolutions necessary to place the structure in the extended and retracted positions; and stop means cooperable with said control shaft to prevent its rotation substantially beyond the positions thereof in which said switch means are actuated, with said slip clutch means enabling said operating shaft to continue to rotate when movement of said control shaft substantially beyond said positions is prevented by said stop means, whereby said positions may be correlated with desired movement limits of said structure to be moved by said operating shaft.

2. Apparatus as defined in claim 1, wherein said switch means include a pair of switches with actuating plungers positioned adjacent said control shaft, wherein said actuating means includes a pair of cams carried by said control shaft, said cams being adapted to actuate said plungers in respective positions of said control shaft, and wherein said control shaft is adapted through said worm and worm wheel to move from one to the other of such positions while the operating shaft is rotating through the number of revolutions required to move the structure from one to the other of its extended and retracted positions.

3. Apparatus as defined in claim 1, wherein said means cooperable with said control shaft includes an arm fixed to said control shaft; and a pair of fixed, spaced stop elements in the path of said arm, whereby upon said arm engaging either of said stop elements, said slip clutch menas operates to prevent further rotation of said control shaft from the operating shaft.

4. An electromechanical actuator comprising: an operating shaft for operating an output member from one end thereof; a motor having an output shaft; reduction gearing means; driving clutch means for coupling said reduction gearing means to said motor output shaft and to said operating shaft; limiting means including a control shaft; slip clutch means interconnecting said operating shaft and said control shaft; switch means for stopping said motor; means operable by said control shaft to actuate said switch means after a predetermined number of revolutions of said operating shaft; and limit stops for said control shaft, said limit stops being positioned to prevent angular movement of said control shaft beyond the positions in which the switch means are actuated, said slip clutch means functioning at said limit stops to free said control shaft from operative engagement with the operating shaft, so as to enable said operating shaft to continue to rotate when movement of said control shaft substantially beyond said positions is prevented by said limit stops, whereby said positions may be correlated with desired movement limits of said output member operated by said operating shaft.

References Cited in the file of this patent

UNITED STATES PATENTS

| | | |
|---|---|---|
| 2,391,470 | May | Dec. 25, 1945 |
| 2,437,591 | Briskin et al. | Mar. 9, 1948 |
| 2,469,269 | Lear | May 3, 1949 |
| 2,482,464 | Chapman | Sept. 20, 1949 |
| 2,597,514 | Nash | May 20, 1952 |
| 2,606,257 | Briskin | Aug. 5, 1952 |
| 2,606,431 | Elgin | Aug. 12, 1952 |
| 2,809,736 | Hoover | Oct. 15, 1957 |
| 2,854,113 | Hallden | Sept. 30, 1958 |